(12) United States Patent
Planque et al.

(10) Patent No.: US 11,283,098 B2
(45) Date of Patent: Mar. 22, 2022

(54) SYSTEM FOR HIGH-TEMPERATURE TIGHT COUPLING OF A STACK HAVING SOEC/SOFC-TYPE SOLID OXIDES

(71) Applicant: COMMISSARIAT A L'ENERGIE ATOMIQUE ET AUX ENERGIES ALTERNATIVES, Paris (FR)

(72) Inventors: Michel Planque, Seyssins (FR); Bruno Oresic, Tullins (FR); Guilhem Roux, Saint Egreve (FR); Charlotte Bernard, La Buisse (FR); Philippe Szynal, Chignin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 439 days.

(21) Appl. No.: 16/473,809

(22) PCT Filed: Dec. 27, 2017

(86) PCT No.: PCT/FR2017/053849
§ 371 (c)(1),
(2) Date: Jun. 26, 2019

(87) PCT Pub. No.: WO2018/122531
PCT Pub. Date: Jul. 5, 2018

(65) Prior Publication Data
US 2019/0326621 A1    Oct. 24, 2019

(30) Foreign Application Priority Data

Jan. 2, 2017   (FR) .................................... 17 50009

(51) Int. Cl.
*H01M 8/248*      (2016.01)
*H01M 8/2428*     (2016.01)
(Continued)

(52) U.S. Cl.
CPC ............... *H01M 8/248* (2013.01); *C25B 1/04* (2013.01); *C25B 9/65* (2021.01); *C25B 9/73* (2021.01);
(Continued)

(58) Field of Classification Search
CPC ............... H01M 8/248; H01M 8/0271; H01M 8/04022; H01M 8/1246; H01M 8/2428; H01M 2008/1293; C25B 1/04; C25B 9/73
See application file for complete search history.

(56) References Cited

U.S. PATENT DOCUMENTS

| 8,945,356 B2 | 2/2015 | Le Gallo et al. |
| 2006/0147778 A1* | 7/2006 | Matsuzaki .......... H01M 8/0228 429/454 |

(Continued)

FOREIGN PATENT DOCUMENTS

| CN | 203653708 U | 6/2014 |
| CN | 203836426 U | 9/2014 |

OTHER PUBLICATIONS

U.S. Appl. No. 16/333,299, filed Mar. 14, 2019, Vincent Lacroix et al.

(Continued)

*Primary Examiner* — Stewart A Fraser
(74) *Attorney, Agent, or Firm* — Oblon, McClelland, Maier & Neustadt, L.L.P.

(57) ABSTRACT

A coupling system for high-temperature tight coupling of a stack having SOEC/SOFC-type solid oxides is described. The system includes a threaded hollow connector, a smooth hollow connector, and a threaded nut. The threaded hollow connector includes an opening for establishing fluid communication with a gas inlet/outlet pipe and is intended to be attached to the gas inlet/outlet pipe. The smooth hollow connector includes an opening for establishing fluid com- (Continued)

munication with a gas inlet/outlet pipe of the stack and is intended to be attached to the inlet/outlet pipe. The threaded nut engages with the threaded hollow connector to form a screw/nut system, slides relative to the smooth hollow connector, and includes a first threaded portion and a second smooth portion in sliding contact with the smooth hollow connector.

15 Claims, 3 Drawing Sheets

(51) Int. Cl.
  *C25B 1/04* (2021.01)
  *H01M 8/0271* (2016.01)
  *H01M 8/04014* (2016.01)
  *H01M 8/1246* (2016.01)
  *C25B 9/65* (2021.01)
  *C25B 9/73* (2021.01)
  *H01M 8/12* (2016.01)

(52) U.S. Cl.
  CPC ..... *H01M 8/0271* (2013.01); *H01M 8/04022* (2013.01); *H01M 8/1246* (2013.01); *H01M 8/2428* (2016.02); *H01M 2008/1293* (2013.01)

(56) References Cited

U.S. PATENT DOCUMENTS

| | | | |
|---|---|---|---|
| 2006/0153974 A1* | 7/2006 | Matsuzaki | H01M 8/0215 427/115 |
| 2008/0233457 A1 | 9/2008 | Adams et al. | |
| 2010/0055525 A1 | 3/2010 | Uematsu et al. | |
| 2011/0244372 A1 | 10/2011 | Adams et al. | |

OTHER PUBLICATIONS

U.S. Appl. No. 16/062,373, filed Jun. 14, 2018, US 2019/0013539 A1, Magali Reytier et al.
International Search Report dated Mar. 13, 2018 in PCT/FR2017/053849 filed on Dec. 27, 2017.
Preliminary French Search Report dated Apr. 3, 2017 in French Application No. 1750009 filed on Jan. 2, 2017.

* cited by examiner

SYSTEM FOR HIGH-TEMPERATURE TIGHT COUPLING OF A STACK HAVING SOEC/SOFC-TYPE SOLID OXIDES

TECHNICAL FIELD

The present invention relates to the general field of high-temperature electrolysis (HTE) of water, in particular high-temperature steam electrolysis (HTSE), carbon dioxide ($CO_2$) electrolysis, or even high-temperature co-electrolysis (HTE) of water with carbon dioxide ($CO_2$).

More specifically, the invention relates to the field of high-temperature solid oxide electrolysers, commonly denoted by the acronym SOEC (Solid Oxide Electrolyser Cell).

It also relates to the field of high-temperature solid oxide fuel cells, commonly denoted by the acronym SOFC (Solid Oxide Fuel Cell).

Thus, more generally speaking, the invention relates to the field of solid oxide stacks of the SOEC/SOFC type operating at a high temperature.

More specifically, the invention relates to a system for the high-temperature sealed coupling of a stack having SOEC/SOFC-type solid oxides, in addition to an assembly comprising a stack having SOEC/SOFC-type solid oxides and a furnace coupled with said stack via such a coupling system.

PRIOR ART

The scope of an SOEC-type high-temperature solid oxide electrolyser involves transforming, by using an electric current, within the same electrochemical device, steam ($H_2O$) into dihydrogen ($H_2$) and dioxygen ($O_2$), and/or transforming carbon dioxide ($CO_2$) into carbon monoxide (CO) and dioxygen ($O_2$). Within the scope of an SOFC-type high-temperature solid oxide fuel cell, this operation is reversed to produce an electric current and heat under a supply of dihydrogen ($H_2$) and dioxygen ($O_2$), generally air and natural gas, i.e. methane ($CH_4$). For simplicity purposes, the description provided hereafter prioritises the functioning of an SOEC-type high-temperature solid oxide electrolyser carrying out the electrolysis of water. However, this functioning is applicable to the electrolysis of carbon dioxide ($CO_2$), or even to the high-temperature co-electrolysis (HTE) of water with carbon dioxide ($CO_2$). Moreover, this functioning is transposable in the case of an SOFC-type high-temperature solid oxide fuel cell.

Water electrolysis is advantageously carried out at a high temperature, typically between 600 and 1,000° C., since it is more advantageous to electrolyse steam than liquid water and since part of the energy required for the reaction can be supplied by heat, which is less expensive than electricity.

For high-temperature electrolysis (HTE) of water to take place, an SOEC-type high-temperature solid oxide electrolyser is formed by a stack of individual cells, each comprising a solid oxide electrolysis cell, or an electrochemical cell, formed by three anode/electrolyte/cathode layers superimposed on top of one another, and of metal alloy interconnect plates, also called bipolar plates or interconnects. Each electrochemical cell is clamped between two interconnect plates. An SOEC-type high-temperature solid oxide electrolyser is thus an alternating stack of electrochemical cells and interconnects. An SOFC-type high-temperature solid oxide fuel cell is formed by the same type of stack of individual cells. Given that this high-temperature technology is reversible, the same stack can operate in electrolysis mode and produce hydrogen and oxygen from water and electricity, or in fuel cell mode and produce electricity from hydrogen and oxygen.

Each electrochemical cell corresponds to an electrolyte/electrode assembly, which is generally a multi-layer, ceramic assembly, the electrolyte whereof is formed by a central ion conductor layer, this layer being solid, dense and impervious, and clamped between the two porous layers forming the electrodes. It should be noted that additional layers can exist, the purpose whereof however is only to improve one or more of the layers described hereinabove.

The electric and fluid interconnect devices are electron conductors which, from an electrical perspective, provide the connection of each individual electrochemical cell in the stack of individual cells, guaranteeing the electrical contact between one face and the cathode of a cell and between the other face and the anode of the next cell, and from a fluid perspective, thus combining the production of each of the cells. The interconnects thus carry out the functions of supplying and acquiring electric current and of delimiting the compartments for the circulation of gases, for distribution and/or acquisition.

More specifically, the main purpose of the interconnects is to ensure the passage of the electric current, as well as the circulation of the gases in the vicinity of each cell (i.e.: injected steam, extracted hydrogen and oxygen for HTE; air and fuel including the injected hydrogen and extracted water for an SOFC), and to separate the anode and cathode compartments of two adjacent cells, which are the gas circulation compartments respectively situated on the anode side and on the cathode side of the cells.

In particular, for an SOEC-type high-temperature solid oxide electrolyser, the cathode compartment comprises the steam and hydrogen produced by the electrochemical reaction, whereas the anode compartment comprises a draining gas, if present, and oxygen, the other product of the electrochemical reaction. For an SOFC-type high-temperature solid oxide fuel cell, the anode compartment comprises the fuel, whereas the cathode compartment comprises the oxidant.

For carrying out high-temperature electrolysis (HTE) of steam, steam ($H_2O$) is injected into the cathode compartment. Under the action of the electric current applied to the cell, dissociation of the water molecules in the form of steam takes place at the interface between the hydrogen electrode (cathode) and the electrolyte: this dissociation produces dihydrogen gas ($H_2$) and oxygen ions ($O^{2-}$). The dihydrogen ($H_2$) is collected and discharged at the outlet of the hydrogen compartment. The oxygen ions ($O^{2-}$) migrate through the electrolyte and recombine into dioxygen ($O_2$) at the interface between the electrolyte and the oxygen electrode (anode). A draining gas, such as air, can circulate at the anode and thus collect the oxygen generated in gaseous form at the anode.

In order to ensure the operation of a solid oxide fuel cell (SOFC), air (oxygen) is injected into the cathode compartment of the fuel cell and hydrogen is injected into the anode compartment. The oxygen in the air will dissociate into $O^{2-}$ ions. These ions will migrate in the electrolyte from the cathode to the anode in order to oxidise the hydrogen and form water while simultaneously producing electricity. With SOFC, as with SOEC electrolysis, the steam is situated in the dihydrogen ($H_2$) compartment. Only the polarity is reversed.

By way of illustration, FIG. 1 shows a diagrammatic view of the operating principle of an SOEC-type high-temperature solid oxide electrolyser. The purpose of such an electrolyser is to transform steam into hydrogen and oxygen according to the electrochemical reaction:

$$2H_2O \rightarrow 2H_2 + O_2.$$

This reaction takes place electrochemically in the cells of the electrolyser. As shown diagrammatically in FIG. 1, each individual electrolysis cell 1 is formed by a cathode 2 and an anode 4, placed on either side of a solid electrolyte 3. The two electrodes (cathode and anode) 2 and 4 are electron and/or ion conductors, made of porous material, and the electrolyte 3 is gas-tight, an electron insulator and an ion conductor. The electrolyte 3 can in particular be an anion conductor, more precisely an anion conductor of the $O^{2-}$ ions and the electrolyser is thus referred to as an anion electrolyser, as opposed to proton electrolytes ($H^+$).

The electrochemical reactions take place at the interface between each of the electron conductors and the ion conductor.

At the cathode 2, the half-reaction is as follows:

$$2H_2O + 4e^- \rightarrow 2H_2 + 2O^{2-}.$$

At the anode 4, the half-reaction is as follows:

$$2O^{2-} \rightarrow O_2 + 4e^-.$$

The electrolyte 3 inserted between the two electrodes 2 and 4 is the site of migration of the $O^{2-}$ ions under the effect of the electrical field created by the difference in potential imposed between the anode 4 and the cathode 2.

As shown in brackets in FIG. 1, the steam at the cathode inlet can be accompanied by hydrogen $H_2$ and the hydrogen produced and recovered at the outlet can be accompanied by steam. Similarly, as shown by dotted lines, a draining gas, such as air, can additionally be injected at the inlet in order to remove the oxygen produced. The injection of a draining gas plays the additional role of acting as thermal regulator.

An individual electrolyser, or electrolysis reactor, consists of an individual cell as described hereinabove, with a cathode 2, an electrolyte 3 and an anode 4, and of two interconnects which perform the electrical, hydraulic and thermal distribution functions.

In order to increase the flow rates of hydrogen and oxygen produced, it is known to stack several individual electrolysis cells on top of one another, separating them with interconnects. The assembly is positioned between two end interconnect plates, which bear the power supplies and gas supplies of the electrolyser (electrolysis reactor).

An SOEC-type high-temperature solid oxide electrolyser thus comprises at least one, generally a plurality of electrolysis cells stacked on top of one another, each individual cell being formed by an electrolyte, a cathode and an anode, the electrolyte being inserted between the anode and the cathode.

As stated above, the fluid and electrical interconnect devices, which are in electrical contact with one or more electrodes generally perform the functions of supplying and acquiring electrical current and delimit one or more compartments for the circulation of the gases.

Thus, the purpose of the so-called cathode compartment is to distribute the electric current and steam and also to recover the hydrogen at the cathode in contact therewith.

The purpose of the so-called anode compartment is to distribute the electric current and also to recover the oxygen produced at the anode in contact therewith, optionally with the use of a draining gas.

FIG. 2 shows an exploded view of individual cells of an SOEC-type high-temperature solid oxide electrolyser of the prior art. This electrolyser comprises a plurality of individual electrolysis cells C1, C2, of the solid oxide (SOEC) type, stacked alternately with interconnects 5. Each cell C1, C2 consists of a cathode 2.1, 2.2 and an anode (only the anode 4.2 of the cell C2 is shown), between which an electrolyte (only the electrolyte 3.2 of the cell C2 is shown) is arranged.

The interconnect 5 is a component made of metal alloy, which provides the separation between the cathode compartment 50 and the anode compartment 51, defined by the volumes that lie between the interconnect 5 and the adjacent cathode 2.1 and between the interconnect 5 and the adjacent anode 4.2 respectively. It also provides for distribution of the gases to the cells. The injection of steam into each individual cell takes place in the cathode compartment 50. The collection of the hydrogen produced and of the residual steam at the cathode 2.1, 2.2, takes place in the cathode compartment 50 downstream of the cell C1, C2 after dissociation of the steam thereby. The collection of the oxygen produced at the anode 4.2 takes place in the anode compartment 51 downstream of the cell C1, C2 after dissociation of the steam thereby. The interconnect 5 ensures passage of the current between the cells C1 and C2 by direct contact with the adjacent electrodes, i.e. between the anode 4.2 and the cathode 2.1.

Since the operating conditions of a high-temperature solid oxide electrolyser (SOEC) are very similar to those of a solid oxide fuel cell (SOFC), the same technological restrictions apply.

Thus, the correct operation of such stacks having SOEC/SOFC-type solid oxides operating at a high temperature mainly requires the following points to be met.

Firstly, electrical insulation must be present between two successive interconnects, without which the electrochemical cell will be short-circuited, and a good electrical contact and a sufficient contact surface must also be present between a cell and an interconnect. The lowest ohmic resistance possible is sought between cells and interconnects.

Moreover, a seal must be obtained between the anode and cathode compartments, without which the gases produced will recombine, resulting in a reduced yield and above all in the appearance of hot spots, which damage the stack.

Finally, a good distribution of the gases is required, both at the inlet and on collection of the gases produced, without which distribution there will be a loss of yield, non-uniformity of pressure and non-uniformity of temperature within the different individual cells, or even unacceptable deterioration of the electrochemical cells.

The gases entering and leaving a high-temperature electrolysis stack (SOEC) or fuel cell (SOFC) operating at a high temperature can be managed using appropriate devices of a furnace such as that shown with reference to FIG. 3.

The furnace 10 thus comprises cold parts PF and hot parts PC, the latter comprising the furnace hearth 11, a looped pipe 12 for managing the gas inlets and outlets and the high-temperature electrolysis (SOEC) or fuel cell (SOFC) stack 20.

The couplings of the gas supply and discharge devices are usually made at the cold parts PF, in particular by double ferrule mechanical grip fittings, VCR® metal gasket face seal fittings, welded connections or sealed partition bushings.

In the case of double ferrule mechanical grip fittings, the two ferrules separate the sealing and pipe clamping functions. The front ferrule creates a seal, whereas the rear ferrule allows the front ferrule to advance axially and applies an effective radial clamping on the pipe. This principle procures a very good clamping of the pipe and a very good impermeability to gas. Moreover, it is easy to install and has a very high resistance to fatigue caused by vibrations. It is easy to disassemble when no welds are present. However, the major drawback thereof is its lack of resistance to high temperatures, whereby the rear ferrule, the front ferrule and the pipe can become welded together by diffusion bonding, preventing the junction from being disassembled.

In the case of VCR® metal gasket face seal fittings, the seal is obtained when the gasket is compressed by two beads when tightening a male nut or hex body with a female nut. This principle procures a very good seal, the possibility of using different gaskets (nickel, copper, stainless steel, etc.) according to the most appropriate configuration, and easy assembly/disassembly with gasket replacement during these operations. However, this solution is not suitable at high temperatures, the operation whereof only allows for a maximum temperature of about 537° C.

In the case of welded connections, total sealing is obtained by the fact that the pipes are welded to one another by a TIG-type method (Tungsten Inert Gas) or by orbital welding, i.e. a TIG method coupled with a rotary nozzle. However, the welding operations on a stack 20 mounted in a furnace 10 are very complicated as a result of the reduced accessibility for welding the pipes around the perimeter.

Finally, a coupling system that can withstand a temperature of about 870° C. exists, using sealed partition bushings for passing sensors, probes, electric signals and pipes. These sealed partition bushings take on the form of a 316L stainless steel threaded fitting which must be screwed onto the wall of a piping, a tank or a cover. Depending on the version thereof, these bushings receive one or more penetrating elements of different types, sizes and diameters. These bushings thus allow for the passage of elements without any discontinuity, and do not allow for a sealed junction to be made between two elements.

The couplings of the gas supply and discharge devices at the cold parts PF of the furnace 10 constitute a major drawback since these cold parts PF are distant from the elements of the furnace 10 and are obstructed by the peripherals such as, inter alia, the heat exchangers, insulators and condensers. This means prioritising the production of connections in the hot parts PC while looking to make them capable of being easily disassembled and reused.

Moreover, the use of the enclosure of the furnace 10 to preheat the infeed gases also requires the production of the pipe 12 in a loop, at a length of about 2.5 to 3 m, in order to use the radiation from the heaters of the furnace 10, which increases the complexity in the bends to ensure that the pipes arrive at the correct location in a confined space.

Moreover, if looking to disassemble the stack 20 in order to be able to operate it in another location, thus giving it a "Plug & Play" (PnP)-type feature, the connections must firstly be mechanically broken, for example using a hack saw, and the new connections must be prepared in order to place the stack 20 in another furnace, which significantly complicates handling operations.

Finally, it should be noted that such a stack 20 is very fragile and the number of operations to be carried out when changing location must be limited as far as possible. It is thus in particular important to prevent vibrations, impacts and also turning the stack over.

The aforementioned coupling solutions do not fulfil the aforementioned needs. In particular, the double ferrule mechanical grip fittings become welded together at a high temperature. The welds do not overcome the aforementioned problems as a result of the complexity of the weld (difficult to access) and they do not prevent the pipes from being cut for disassembly.

The coupling solutions of the prior art do not allow the stack 20 to be removed from a furnace 10 for reconnection to another furnace 10, i.e. do not procure a "Plug & Play" feature, without mechanically breaking the junctions, which requires operators responsible for assembly/disassembly to perform tedious bending, coupling and adaptation work.

DESCRIPTION OF THE INVENTION

The purpose of the invention is to at least partially satisfy the aforementioned needs and overcome the drawbacks regarding the productions of the prior art.

It in particular relates to the production of a particular design of the coupling of a high-temperature electrolysis (SOEC) or fuel cell (SOFC) stack, and more specifically to the production, in the hot part, i.e. inside the enclosure of a furnace, and perpendicular to the gas inlets and outlets, high-temperature sealed connections, for example able to withstand temperatures of up to about 900° C., that can be removed and reused, thus giving the stack a "Plug & Play"-type feature.

The invention, according to one of the aspects thereof, thus relates to a system for the high-temperature sealed coupling of a stack having SOEC/SOFC-type solid oxides, characterised in that it comprises:
  a hollow connector that is at least partially threaded on the outer surface thereof, referred to as a threaded connector, intended to be attached to a gas inlet/outlet pipe, the threaded connector comprising an opening for establishing fluid communication with the gas inlet/outlet pipe,
  a hollow connector having an outer surface that is at least partially smooth, referred to as a smooth connector, intended to be attached to a gas inlet/outlet pipe of the stack having SOEC/SOFC-type solid oxides, the smooth connector comprising an opening for establishing fluid communication with the gas inlet/outlet pipe of the stack, the smooth connector and the threaded connector each comprising an opening for establishing fluid communication with one another,
  a threaded nut, capable of engaging with the threaded connector to form a screw/nut system and capable of sliding relative to the smooth connector, the threaded nut comprising, on the inner surface thereof, a first threaded portion engaging with the thread of the threaded connector and a second smooth portion in sliding contact with the smooth connector, on the smooth outer surface thereof.

The coupling system according to the invention can further comprise one or more of the following features, which must be considered singly or according to any technical combinations possible.

Advantageously, the smooth connector can comprise a protruding rim that protrudes relative to the smooth outer surface thereof. The threaded nut can further comprise a protruding rim that protrudes relative to the first threaded portion thereof and comprising the second smooth portion. The rim of the smooth connector and the rim of the threaded nut can be capable of coming into contact with one another, stopping the sliding of the threaded nut relative to the smooth connector.

The coupling system according to the invention can further comprise a gasket, in particular a mica gasket, placed between the rim of the smooth connector and the rim of the threaded nut. Such a gasket can, in particular, be useful for electrical insulation.

Moreover, the smooth connector, the threaded nut and the threaded connector can be made from a nickel-based superalloy, in particular and preferentially of the Inconel 600 type, or even of the Inconel 625 type, and/or can be made from austenitic stainless steel, in particular of the 316L stainless steel type.

The smooth connector can comprise a bore for the attachment thereof to a gas inlet/outlet pipe of the stack having SOEC/SOFC-type solid oxides.

Similarly, the threaded connector can comprise a bore for the attachment thereof to a gas inlet/outlet pipe.

The coupling system according to the invention can further comprise a gasket, in particular a mica gasket, placed between the threaded connector and the smooth connector. The thickness of the gasket can lie in the range 0.1 to 1 mm. Such a gasket can, in particular, be useful for sealing the system. Advantageously, the thickness of the gasket can be less than or equal to 0.3 mm so as to create a seal both under hot and cold conditions. Preferably, this thickness is less than or equal to 0.25 mm.

The nominal diameter of the threaded nut and/or of the threaded connector can lie in the range M20 to M30, and preferentially be equal to M27. Thick threadings and a large pitch can advantageously prevent diffusion bonding between the threads, and thus ease disassembly of the connection established.

Moreover, the threaded connector can have a height that lies in the range 15 to 30 mm, and a diameter that lies in the range 20 to 30 mm.

Moreover, the smooth connector can have a height that lies in the range 45 to 70 mm, and a maximum diameter of 30 mm.

The first threaded portion of the threaded nut and/or the threading of the threaded connector can furthermore be coated in an anti-seize agent capable of withstanding high temperatures.

Another purpose of the invention, according to another feature thereof, is an assembly, characterised in that it comprises:
 a stack having SOEC/SOFC-type solid oxides operating at a high temperature,
 a furnace with which the stack is coupled for the supply and discharge of the gases,
 a coupling system as defined hereinabove for coupling the stack with the furnace.

The threaded connector can preferentially be welded to a gas inlet/outlet pipe of the furnace, in particular by TIG-type welding.

Furthermore, the threaded connector can be welded to a support plate attached to the hearth of the furnace, in particular by TIG-type welding and/or by arc welding, the gas inlet/outlet pipe of the furnace passing through the support plate.

Similarly, the smooth connector can preferentially be welded to a gas inlet/outlet pipe of the stack having SOEC/SOFC-type solid oxides, in particular by TIG-type welding.

Furthermore, the smooth connector can be welded to a lower end plate of the stack, in particular by TIG-type welding and/or by arc welding, the gas inlet/outlet pipe of the stack passing through the lower end plate.

Advantageously, the first threaded portion of the threaded nut and/or the threading of the threaded connector can be coated, before placement and tightening, with a high-temperature anti-seize paste which can ease disassembly and prevent diffusion bonding of the threads. This anti-seize paste can be a high-temperature anti-corrosion lubricant and anti-seize assembly paste used to prevent the seizing and excessive wear of parts exposed to extreme temperatures or corrosive atmospheres such as, inter alia: threadings of heat engines, tubing sets for hot gases, burners, valves, disc brakes, spark plugs, exhaust screw connectors, rollers, bolts and collars. It can have a copper-, aluminium- and graphite-based formulation in order to protect the metal parts and allow for the disassembly thereof. It can, for example, be green grease marketed by Pyrox Thermique Matériaux, consisting of a mixture of 50% chromium 3 powder and copper grease for mechanical parts marketed by Würth.

The coupling system and the assembly according to the invention can comprise any of the features described hereinabove, which must be considered singly or according to any technically possible combinations thereof with other features.

BRIEF DESCRIPTION OF THE FIGURES

The invention will be better understood upon reading the following detailed description of non-limiting example embodiments thereof and upon examining the diagrammatic and partial figures of the accompanying drawing, for which.

In all of these figures, identical references may represent identical or similar elements.

Moreover, the different parts shown in the figures are not necessarily displayed according to a uniform scale in order to make the figures easier to read.

DETAILED DESCRIPTION OF SPECIFIC EMBODIMENTS

Figure 1:
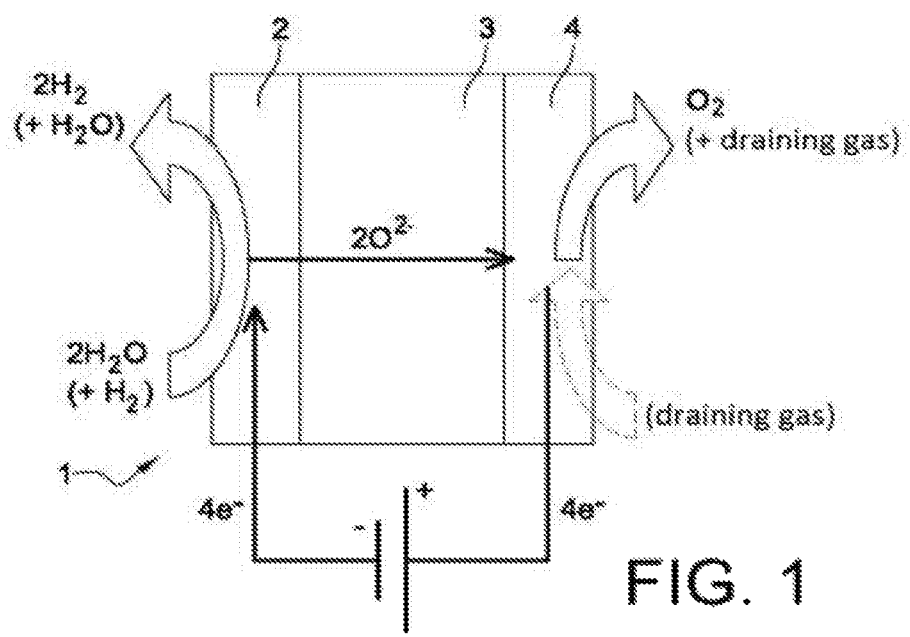
FIG. 1 is a diagrammatic view showing the operating principle of a high-temperature solid oxide electrolyser (SOEC)
Figure 2:
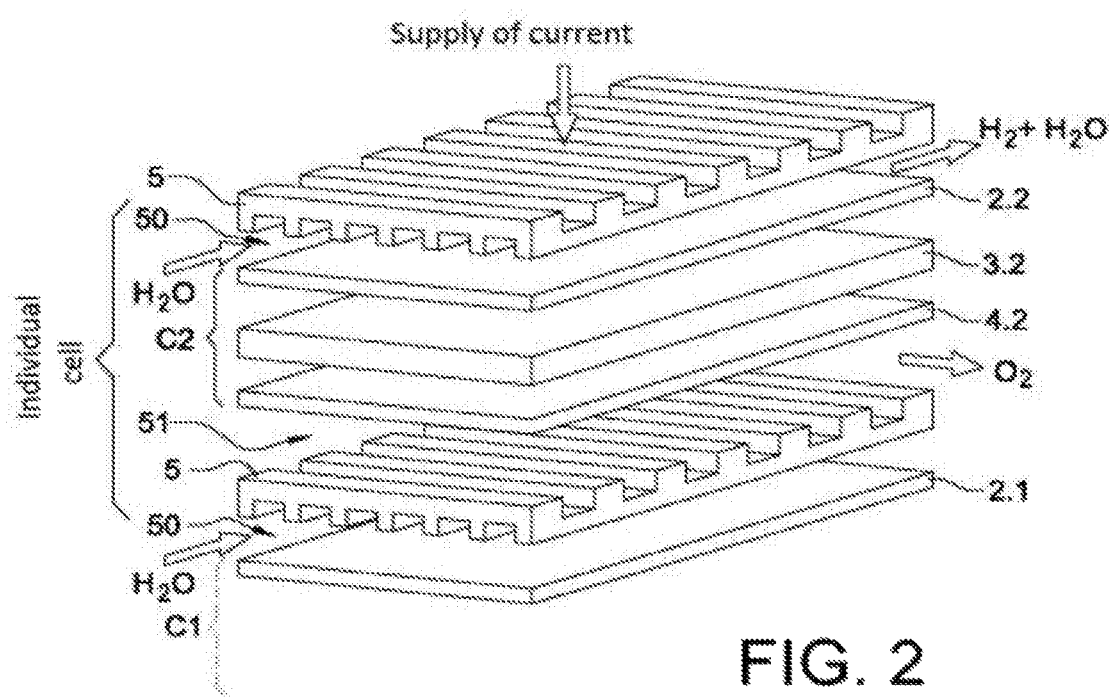
FIG. 2 shows an exploded diagrammatic view of a part of a high-temperature solid oxide electrolyser (SOEC) comprising interconnects according to the prior art.
Figure 3:
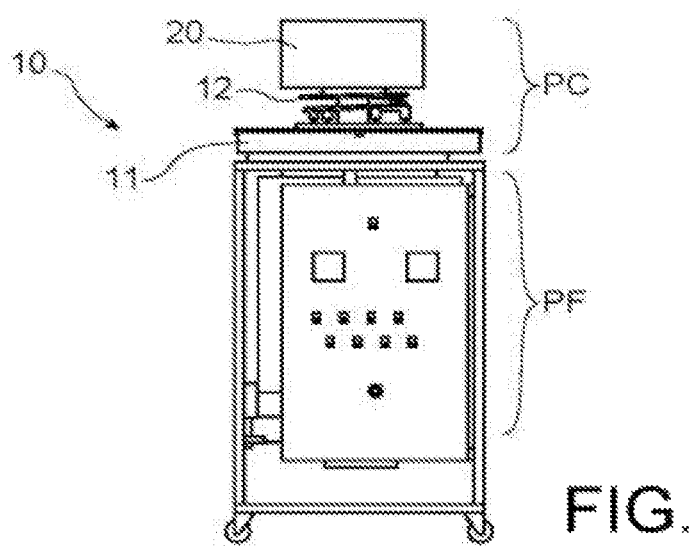
FIG. 3 shows the architectural principle of a furnace on which a high-temperature electrolysis (SOEC) or fuel cell (SOFC) stack operating at a high temperature is placed.

FIGS. 1 to 3 have been described hereinabove in the paragraphs on the prior art and technical background of the invention. It is specified here that, in FIGS. 1 and 2, the symbols and arrows showing the supply of steam $H_2O$, the distribution and collection of dihydrogen $H_2$, oxygen $O_2$, air, and the electric current, are shown for the purposes of clarity and precision, to illustrate the operation of the devices shown.

It should also be noted that all component parts (anode/electrolyte/cathode) of a given electrochemical cell are preferentially ceramics. The operating temperature of a high-temperature SOEC/SOFC-type stack typically lies in the range 600° C. to 1,000° C.

Moreover, the terms "upper" and "lower" must be understood herein to be relative to the normal orientation of a stack of the SOEC/SOFC type when in the configuration of use thereof.

Figure 4:
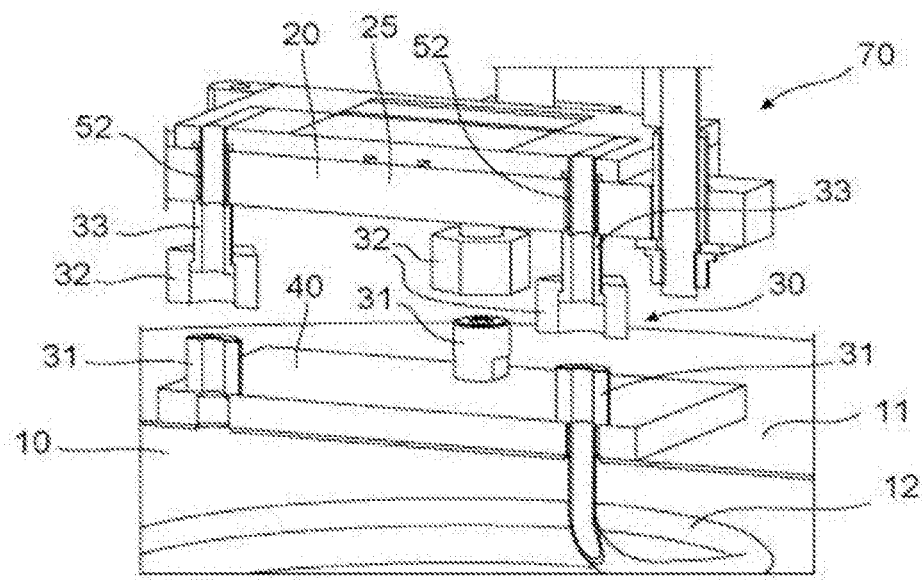
FIG. 4 shows a partial, perspective view of one example of a coupling system according to the invention for a stack having SOEC/SOFC-type solid oxides, in the configuration for use thereof for coupling the stack with a furnace, and FIGS. 5 and 6 respectively show an isolated, perspective view of coupling systems according to the invention in the assembled configuration and in the disassembled configuration of the threaded nut and of the threaded connector.
Figure 5:
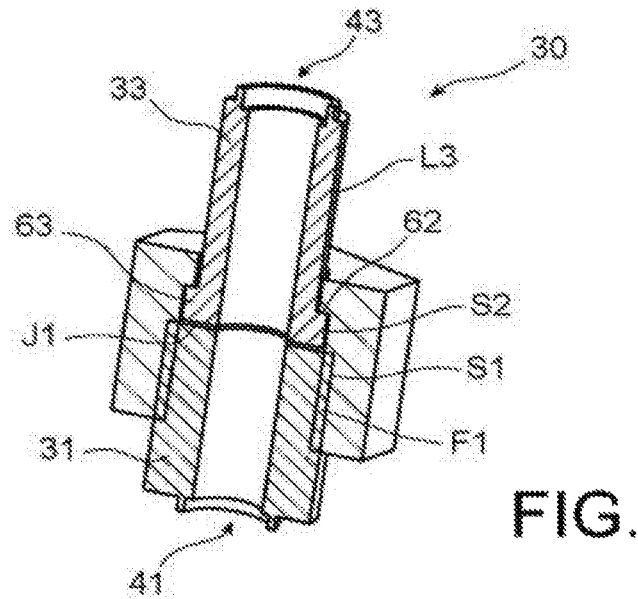
Figure 6:
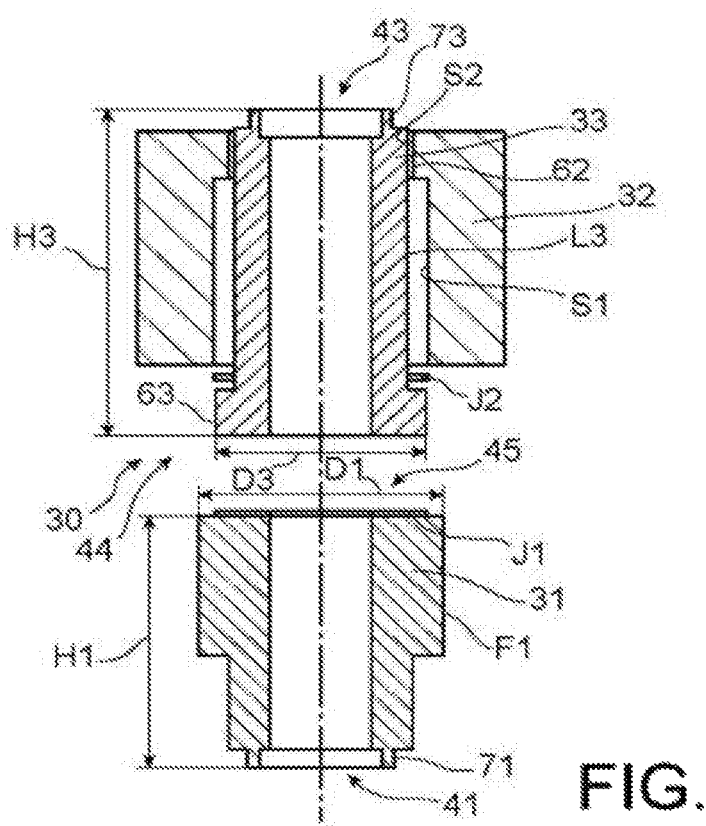

FIGS. 4 to 6 show a principle for producing a coupling system 30 according to the invention. This coupling system 30 produces the coupling between a stack 20 of the SOEC/SOFC type and a furnace 10 capable of allowing for the supply and discharge of the gases in the stack 20. Generally speaking, the coupling system 30 is of the screw/nut type.

FIG. 4 shows an assembly 70 comprising a stack 20 having SOEC/SOFC-type solid oxides operating at a high temperature and a furnace 10 with which the stack 20 is coupled for the supply and discharge of the gases via coupling systems 30 according to the invention. More specifically, the assembly 70 comprises four coupling systems 30 for the two inlets/outlets provided for the stack 20.

As shown in FIGS. 4 to 6, each coupling system 30 firstly comprises a hollow threaded connector 31. This threaded connector 31 comprises a thread F1 on the outer surface thereof, and is attached to a gas inlet/outlet pipe 12. More specifically, the threaded connector 31 is attached to this gas inlet/outlet pipe 12 by TIG-type welding, which constitutes the bearing plane for the stack 20, which thus forms a part of the hearth 11 of the furnace.

Moreover, the hearth 11 of the furnace 10 comprises, in this example, a support plate 40 through which passes the gas inlet/outlet pipe 12, and the threaded connector 31 is also attached to this support plate 40, in particular by TIG-type welding or by arc welding.

The threaded connector 31 comprises an opening 41 for establishing fluid communication with the gas inlet/outlet pipe 12. It is thus positioned perpendicular to the pipe 12, forming a supply loop to the stack 20.

Moreover, each coupling system 30 further comprises a hollow smooth connector 33 having a smooth outer surface L3 and, at the lower part thereof, a rim 63 protruding relative to this smooth outer surface L3, as shown in FIG. 6.

The smooth connector 33 is attached by welding to a gas inlet/outlet pipe 52 of the stack 20 having SOEC/SOFC-type solid oxides, in particular by TIG-type welding. Moreover, the smooth connector 33 is also attached by welding to a lower end plate 25 of the stack 20, in particular by TIG-type welding or by arc welding. The gas inlet/outlet pipe 52 of the stack 20 thus passes through the lower end plate 25, as shown in FIG. 4.

Moreover, the smooth connector 33 comprises an opening 43 for establishing fluid communication with the gas inlet/outlet pipe 52 of the stack 20.

The smooth connector 33 and the threaded connector 31 each comprise an opening 44, 45 for establishing fluid communication between the two connectors 33 and 31, as shown in FIG. 6.

Furthermore, in order to allow for the assembly thereof with the gas inlet/outlet pipe 52 of the stack 20, the upper part of the smooth connector 33 comprises a bore 73, as shown in FIG. 6. Similarly, the threaded connector 31 comprises a bore 71 for the attachment thereof to the gas inlet/outlet pipe 12.

Moreover, according to the invention, each coupling system 30 further comprises a threaded nut 32 which engages with the threaded connector 31 to form a screw/nut system.

This threaded nut 32 slides relative to the smooth connector 33. More specifically, the inner surface of the threaded nut 32 comprises a first threaded portion S1 engaging with the thread F1 of the threaded connector 31 and a second smooth portion S2 in sliding contact on the smooth outer surface L3 of the smooth connector 33. More particularly, the threaded nut 32 comprises a rim 62 protruding relative to the first threaded portion S1 thereof, as shown in FIG. 6. This rim 62 comprises the second smooth portion S2. Thus, the rim 63 of the smooth connector 33 and the rim 62 of the threaded nut 32 come into contact with one another, which stops the sliding of the threaded nut 32 relative to the smooth connector 33.

In other words, the threaded nut 32, mounted such that it slides on the smooth connector 33, preferentially with clearance, will thus move down onto the smooth connector 33 and come into contact with the flat surface of the rim 63 of the smooth connector 33 by way of the flat surface of the rim 62 of the threaded nut 32. Thus, a plane-plane contact is established. The threaded nut 32 is retained by the smooth connector 33, i.e. it cannot be disassembled. The smooth connector 33 and the threaded nut 32 thus become elements of the stack 20.

Furthermore, as shown in FIG. 6, a mica gasket J2 can be placed between the rim 63 of the smooth connector 33 and the rim 62 of the threaded nut 32. This gasket J2 can resemble a mica washer inserted at the plane/plane contact in order to electrically insulate the connection where necessary. The presence of such a gasket J2 is not required if there is no need for electrical insulation.

Moreover, the nominal diameter of the threaded nut 32 preferentially lies in the range M20 to M30. It should be noted that the greater the diameter, the better the clamping, however the choice of diameter depends on the available overall dimensions. Moreover, the thicker the chosen threads, the lower the risk of "bonding" of the diffusion bonding type. In the case of a diameter M20, the thread pitch is 2.5 mm, and in the case of a diameter M30, the thread pitch is 3.5 mm.

Advantageously, the first threaded portion S1 of the threaded nut 32 and the thread F1 of the threaded connector 31 are coated, before placement and tightening of the connection, with a high-temperature anti-seize paste in order to ease disassembly and prevent the diffusion bonding phenomenon. This anti-seize paste further lubricates the connection and has anti-corrosion properties. It prevents the seizing and excessive wear of parts exposed to extreme temperatures or so-called corrosive atmospheres, for example in the case of heat engine threadings, tubing sets for hot gases, burners, valves, disc brakes, spark plugs, exhaust screw connectors, rollers, bolts and collars, etc. The copper-, aluminium- and graphite-based formulation thereof can protect the metal parts and ensure the disassembly thereof.

Moreover, as shown in FIGS. 5 and 6, each coupling system 30 further comprises another mica gasket J1 placed between the threaded connector 31 and the smooth connector 33. The thickness of the mica gasket J1 preferentially lies in the range 0.1 to 1 mm. This gasket J1 can take on the form of a washer punch-cut as needed. The mica has high electrical insulation properties and high thermal stability, i.e. at a continuous temperature of 900° C. and at a peak temperature of 1,000° C. During assembly, high mechanical compression is applied in order to exert a pressure on the gasket J1 that lies in the range 70 to 100 N/m.

Furthermore, during assembly, the tightening of the threaded nut 32 after having placed the mica gasket J1 causes the smooth connector 33, which will form a part of the stack 20, to move closer to the threaded connector 31, which will form a part of the furnace 10, in order to place the planar faces in contact, which will sandwich the mica gasket J1 therebetween. The same principle is applied at all of the inlets/outlets of the stack 20 such that the positioning of the stack 20 perpendicular to the four threaded connectors 31 results in the weight of the applied assembly already being sealed.

Preferentially, the smooth connector 33, the threaded nut 32 and the threaded connector 31 are made from a nickel-based superalloy, in particular of the Inconel 600 type, and/or are made from austenitic stainless steel, in particular of the 316L stainless steel type. The threaded connector 31 has a height H1 that lies in the range 15 to 30 mm and a diameter D1 that lies in the range 20 to 30 mm. Moreover, the smooth connector 33 has a height H3 that lies in the range 45 to 70 mm and a maximum diameter D3 of 30 mm, as shown in FIG. 6. The height H3 of the smooth connector 33 must be great enough for the threaded nut 32 to be removed when placing the stack 20. In the case of a threaded nut 32 of the type M20, the height H3 of the smooth connector 33 is, for example, 30 mm. In the case of a threaded nut 32 of the type M30, the height H3 of the smooth connector 33 is, for example, 40 mm.

The present invention has many advantages compared to the solutions of the prior art, which advantages are at least partially described hereinbelow.

Given that the stack 20 must be removed and transported from one furnace 10 to another, thus having a "Plug & Play"-type feature, the invention allows for the connections to be easily disconnected using open-ended spanners since no contact has been made between the materials.

Moreover, such a disassembly operation is facilitated by the coating of the threads of the threaded connector 31 and the tappings of the threaded nut 32, before cycling in the furnace 10, with a high-temperature anti-seize paste. The gasket surfaces can thus be surface-treated using sandpaper in order to prepare them for another cycling.

Furthermore, the seal is ensured by the pressure applied to the mica gasket J1 and not by the threading such that the invention does not require the production of optional conical threadings to improve sealing. Moreover, the assembly eliminates potential alignment and parallelism defects concerning the contact surfaces with the gasket J1 as a result of the adaptability of the connection by elastic deformation of the assembly upon pressurisation.

Furthermore, the use of mica gaskets J1 and J2 allows said gaskets to be manufactured in situ, i.e. on the geographical site where the furnace 10 is situated, for example by using a simple punch or a pair of scissors allowing the desired dimensions of the gaskets J1 and J2 to be obtained, as well as geometrical shapes that are not necessarily circular.

It goes without saying that the invention is not limited to the aforementioned examples of embodiment. Various modifications can be made thereto by a person skilled in the art.

The invention claimed is:

1. An assembly, comprising:
a stack having SOEC/SOFC-type solid oxides operating at a high temperature; and
a system coupling the stack to a furnace, the system comprising:
a threaded hollow connector, which is at least partially threaded on an outer surface thereof, is intended to be attached to a gas inlet/outlet pipe, and comprises an opening for establishing fluid communication with the gas inlet/outlet pipe,
a smooth hollow connector, which has an outer surface that is at least partially smooth, is intended to be attached to a gas inlet/outlet pipe of the stack, and comprises an opening for establishing fluid communication with the gas inlet/outlet pipe of the stack, and
a threaded nut, which engages with the threaded hollow connector to form a screw/nut system, slides relative to the smooth hollow connector, and comprises a first threaded portion on an inner surface and a second smooth portion on an outer surface,
wherein
the smooth hollow connector and the threaded hollow connector each comprise an opening for establishing fluid communication with one another,
the first threaded portion of the threaded nut engages with the thread of the threaded hollow connector, and
the second smooth portion of the threaded nut is in sliding contact with the smooth hollow connector.

2. The assembly according to claim 1, wherein
the smooth hollow connector comprises a rim that protrudes relative to the smooth outer surface thereof,
the threaded nut comprises a rim that protrudes relative to the first threaded portion thereof, and
the rim of the smooth hollow connector and the rim of the threaded nut contacts one another and stops the sliding of the threaded nut relative to the smooth hollow connector.

3. The assembly according to claim 2, wherein the system further comprises a gasket placed between the rim of the smooth hollow connector and the rim of the threaded nut.

4. The assembly according to claim 1, wherein the smooth hollow connector, the threaded nut and the threaded hollow connector are made from a nickel-based superalloy and/or austenitic stainless steel.

5. The assembly according to claim 1, wherein
the smooth hollow connector comprises a bore for attaching it to the gas inlet/outlet pipe of the stack, and
the threaded hollow connector comprises a bore for attaching it to the gas inlet/outlet pipe.

6. The assembly according to claim 1, wherein the system further comprises a gasket placed between the threaded hollow connector and the smooth hollow connector.

7. The assembly according to claim 1, wherein a nominal diameter of the threaded nut lies in the range of from M20 to M30.

8. The assembly according to claim 1, wherein the threaded hollow connector has a height that lies in the range of from 15 to 30 mm and a diameter that lies in the range of from 20 to 30 mm.

9. The assembly according to claim 1, wherein the smooth hollow connector has a height that lies in the range of from 45 to 70 mm and a maximum diameter of 30 mm.

10. The assembly according to claim 1, wherein the first threaded portion of the threaded nut and/or the threading of the threaded hollow connector are coated in an anti-seize agent capable of withstanding high temperatures.

11. The assembly according to claim 1, wherein the furnace supplies and discharges gases.

12. The assembly according to claim 1, wherein the threaded hollow connector is welded to a gas inlet/outlet pipe of the furnace.

13. The assembly according to claim 1, wherein
the threaded hollow connector is welded to a support plate attached to a hearth of the furnace, and
a gas inlet/outlet pipe of the furnace passes through the support plate.

14. The assembly according to claim 1, wherein the smooth hollow connector is welded to the gas inlet/outlet pipe of the stack.

15. The assembly according to claim 1, wherein
the smooth hollow connector is welded to a lower end plate of the stack, and
the gas inlet/outlet pipe of the stack passes through the lower end plate.

* * * * *